United States Patent
Manabe (10) Patent No.: US 8,379,251 B2
(45) Date of Patent: Feb. 19, 2013

(54) IMAGE FORMING SYSTEM AND IMAGE FORMING APPARATUS

(75) Inventor: Hiroshi Manabe, Osaka (JP)

(73) Assignee: Kyocera Milta Corporation, Osaka (JP)

( * ) Notice: Subject to any disclaimer, the term of this patent is extended or adjusted under 35 U.S.C. 154(b) by 883 days.

(21) Appl. No.: 12/419,598

(22) Filed: Apr. 7, 2009

(65) Prior Publication Data

US 2010/0007913 A1    Jan. 14, 2010

(30) Foreign Application Priority Data

Jul. 14, 2008    (JP) .................. 2008-182413

(51) Int. Cl.
*G06F 3/12* (2006.01)
*G06F 15/16* (2006.01)

(52) U.S. Cl. ....... 358/1.15; 358/1.13; 709/201; 709/230
(58) Field of Classification Search ............... 358/1.13, 358/1.15; 709/201, 230
See application file for complete search history.

(56) References Cited

U.S. PATENT DOCUMENTS

| | | | |
|---|---|---|---|
| 6,178,004 B1 | 1/2001 | Ochiai | |
| 2003/0002075 A1* | 1/2003 | Osanai et al. | 358/1.15 |
| 2003/0115197 A1* | 6/2003 | Horan et al. | 707/6 |
| 2003/0137682 A1* | 7/2003 | Sakai et al. | 358/1.13 |
| 2004/0001222 A1* | 1/2004 | Ogura | 358/1.15 |
| 2007/0127385 A1* | 6/2007 | Yasuie et al. | 370/242 |
| 2007/0199069 A1* | 8/2007 | Ohtake et al. | 726/20 |
| 2007/0226326 A1* | 9/2007 | Gili et al. | 709/223 |
| 2009/0007130 A1 | 1/2009 | Sakai et al. | |

FOREIGN PATENT DOCUMENTS

| | | |
|---|---|---|
| JP | 2003-015970 | 1/2003 |
| JP | 2003-216392 | 7/2003 |
| JP | 2004-129047 | 4/2004 |
| JP | 2005-229592 | 8/2005 |

* cited by examiner

*Primary Examiner* — King Poon
*Assistant Examiner* — Allen H Nguyen
(74) *Attorney, Agent, or Firm* — Dykema Gossett PLLC (57) ABSTRACT

An image forming system for obtaining a counter value of a requested event comprises an image forming apparatus storing counter reference sequence data and counter values and a terminal apparatus specifying event types for the counter values using the counter reference sequence data and obtaining the counter value of the requested event type.

15 Claims, 6 Drawing Sheets

IMAGE FORMING SYSTEM AND IMAGE FORMING APPARATUS

This application is based upon and claims the benefit of priority from the corresponding Japanese Patent Application No. 2008-182413, filed Jul. 14, 2008, the entire contents of which is incorporated herein by reference.

BACKGROUND OF THE INVENTION

1. Field of the Invention

The present invention relates to an image forming system and an image forming apparatus.

2. Description of the Related Art

A technique for managing image forming apparatuses, (such as printers) by an external apparatus (such as a terminal apparatus) using Simple Network Management Protocol (SNMP) has been available. In this technique, management information on image forming apparatuses is held by Management Information Bases (MIBs). The MIBs have a tree data structure. In the MIBs, the management information is registered as MIB objects, which are each assigned an object identifier (OID).

Some image forming apparatuses have a function for counting the number of occurrences of events for each event type and storing the number of occurrences as a counter value. Thus, counter values can be obtained from image forming apparatuses via SNMP.

Because image forming apparatuses support a multiplicity of event types, a large number of counter values generally exist. Thus, in a case where a large number of counter values are stored together as one counter data (one MIB object), reference data is required for specifying the positions of counter values of the event type in the counter data. For example, when the counter data is sequence data, the index of an element of the sequence data is used as the reference data.

In a case where the reference data includes separate reference data for each event type, a terminal apparatus obtains the reference data for each event type, and obtains the counter data from an image forming apparatus. Then, the terminal device extracts a requested counter value at a position specified by the reference data from the count data.

Figure 6:
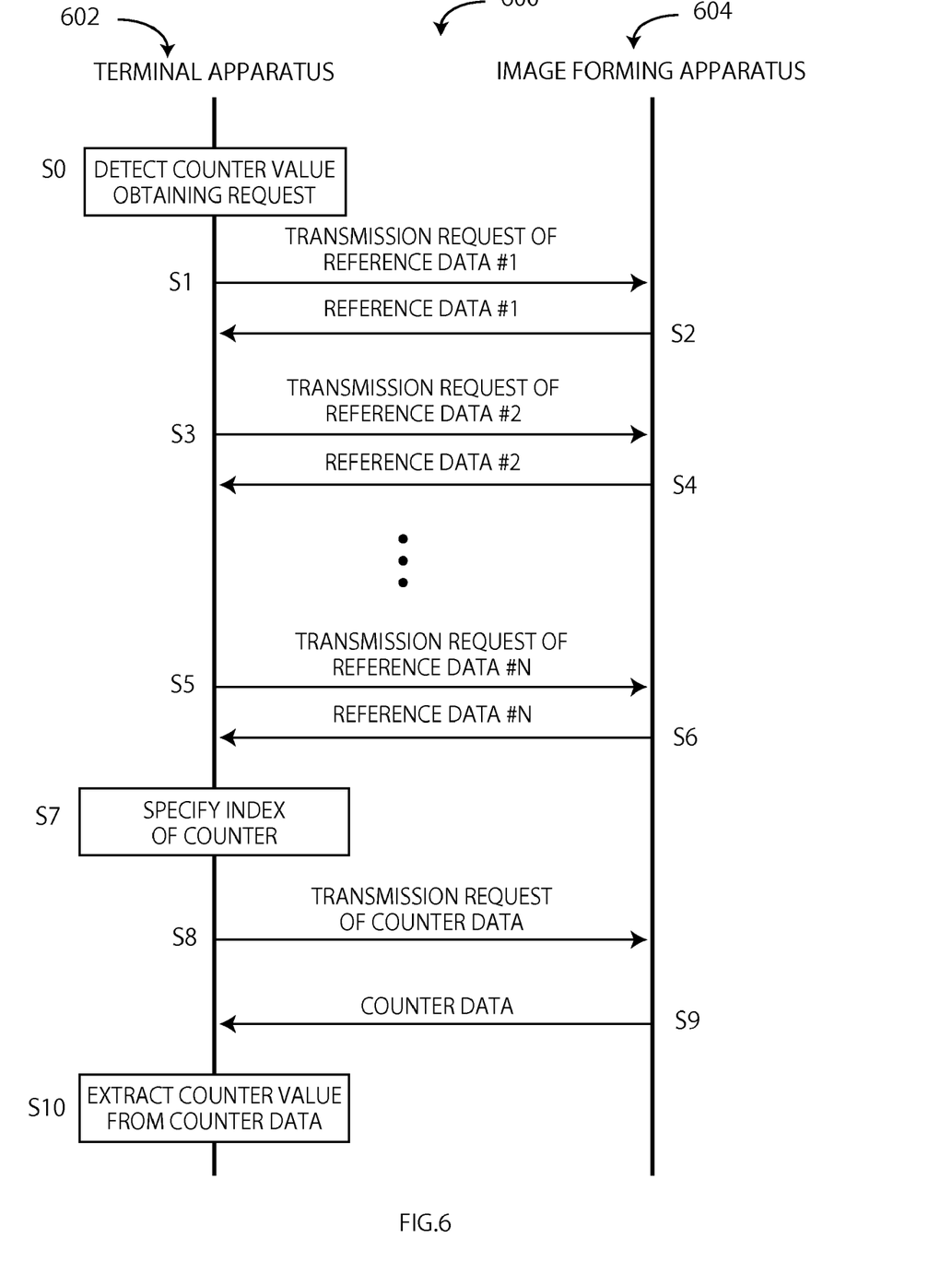
FIG. 6 is a schematic diagram illustrating an example of a process of the related art in which a terminal apparatus obtains a plurality of counter values from an image forming apparatus.

FIG. 6 is a diagram illustrating an exemplary process 600 of the related art in which a terminal apparatus 602 obtains a plurality of counter values from an image forming apparatus 604. The terminal apparatus 602 detects a request for a counter value (step S0). The terminal apparatus 602 then sends a request for the transmission of reference data for a first event type (reference data #1) to the image forming apparatus 604 (step S1). In response, the image forming apparatus 604 transmits reference data #1 to the terminal apparatus 602 (step S2). The terminal apparatus 602 then requests the image forming apparatus 604 to transmit reference data for a second event type (reference data #2) in step S3. In response, the image forming apparatus 604 transmits reference data #2 to the terminal apparatus 602 (step S4). This process of requesting and transmitting reference data repeats a number of times equal to the number of event types (N) (steps S5 and S6).

Once the terminal apparatus 602 has received the reference data for all the N event types, it specifies the index of the counter value 620 (step S7), which identifies the position of the counter value in the counter data for the desired event type. The terminal apparatus 602 then transmits a request for all the counter data to the image forming apparatus 604 (step S8). In response, the image forming apparatus 604, transmits the counter data to the terminal apparatus 602 (step S9). The terminal apparatus 602 then extracts the counter value from the counter data (step S10) corresponding to the position of the counter value identified by the index specified in step S7.

Thus, it is necessary to perform a data obtaining process of at least the number of times equal to the total number of the reference data for each event type and the counter data. Thus, it is difficult to obtain counter values that are stored in an image forming apparatus in for short time.

SUMMARY OF THE INVENTION

The present invention relates to an image forming system in which a terminal apparatus can obtain counter values that have been stored in an image forming apparatus in a short time, and the image forming apparatus.

According to an embodiment of the present invention, an image forming system may include an image forming apparatus configured to count the number of occurrences of a predetermined event and store the number of occurrences as counter data, and a terminal apparatus configured to obtain the counter data from the image forming apparatus.

The image forming apparatus includes a counter configured to count a number of event occurrences in the image forming apparatus, and a data storage device in communication with the counter and configured to store the number of event occurrences as counter data and counter reference sequence data. The counter data includes a plurality of counter values corresponding to a plurality of event types. The counter reference sequence data includes a plurality of counter identifiers indicating to which of the plurality of event types the counter data correspond. The image forming apparatus also includes a first communication processor configured to communicate the counter data and the counter reference sequence data with a terminal apparatus via a communication protocol.

The terminal apparatus includes a second communication processor configured to receive the counter reference sequence data and the counter data from the image forming apparatus, and a counter value obtaining unit configured to specify the event type of each of the counter values in the counter data on the basis of a value of each of elements in the counter reference sequence data and obtain the counter value of the requested event type.

Additional features and advantages are described herein, and will be apparent from the following Detailed Description and the figures.

DETAILED DESCRIPTION OF THE PREFERRED EMBODIMENTS

Hereinafter, is a description of an embodiment according to the present invention with reference to the drawings.

Figure 1:
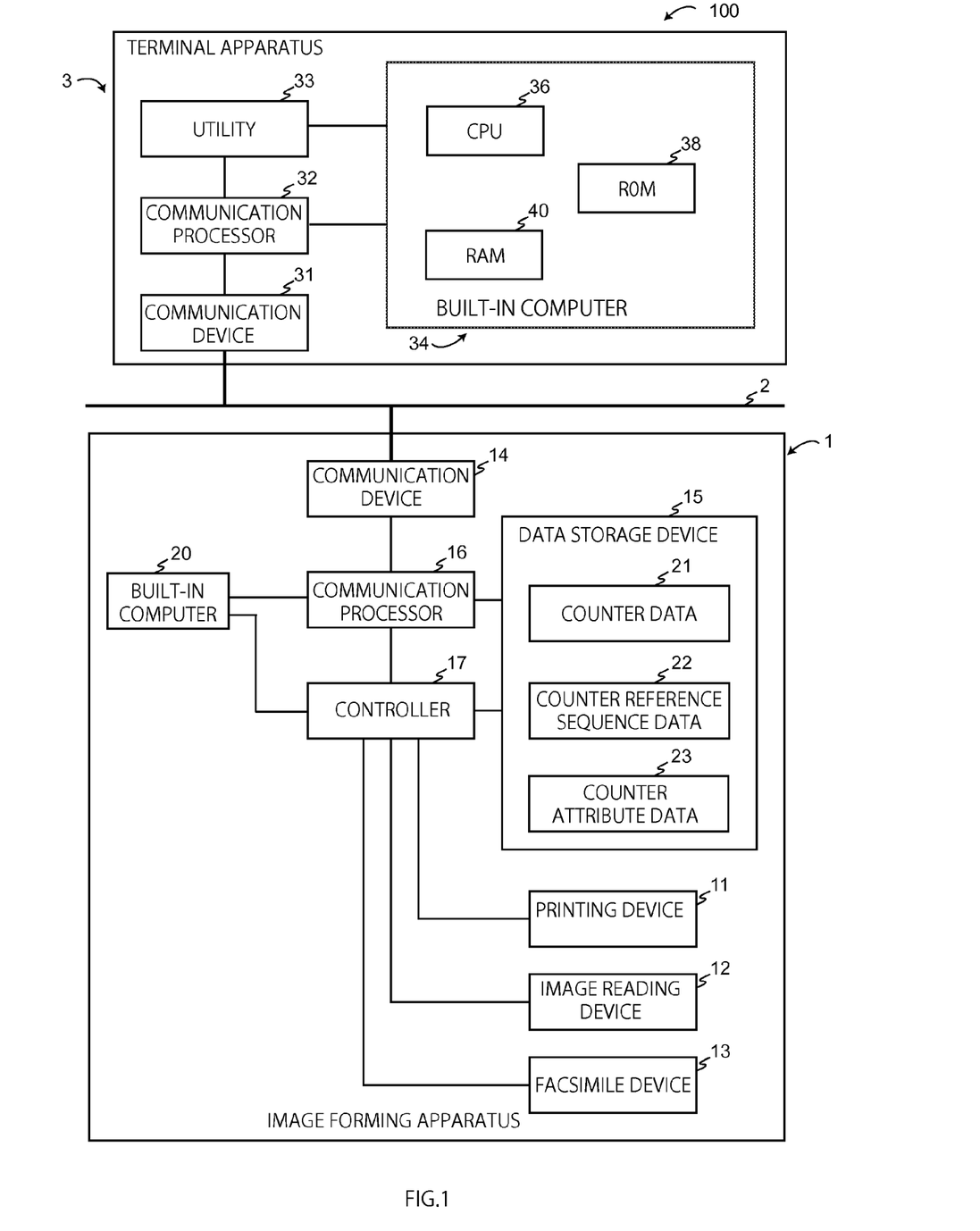
FIG. 1 is a schematic block diagram illustrating a structure of an image forming system according to an embodiment of the present invention.

FIG. 1 is a schematic block diagram illustrating a structure of an image forming system 100 according to an embodiment of the present invention. In the image forming system 100 illustrated in FIG. 1, an image forming apparatus 1 is in communication with a computer network 2, and a terminal apparatus 3 is also in communication with the computer network 2. The image forming apparatus 1 may be an apparatus having at least one of a printing function, an image reading function, and a facsimile transmission and reception function. The computer network 2 may be a network such as a local area network (LAN) or a wide area network (WAN). The terminal apparatus 3 may be, for example, a personal computer.

The image forming apparatus 1 and the terminal apparatus 3 can communicate with each other via SNMP. Therefore, the terminal apparatus 3 can obtain management information managed by an MIB in the image forming apparatus 1, such as counter values, via SNMP.

The image forming apparatus 1 includes a printing device 11, an image reading device 12, a facsimile device 13, a communication device 14, a data storage device 15, a communication processor 16 (an example of a first communication processor), and a controller 17.

The printing device 11 is an internal device having a printing function for printing a document image based on document data. The image reading device 12 is an internal device for optically reading a document image from a document and generating image data of the document image. The facsimile device 13 is an internal device for generating a facsimile signal from document data to be transmitted and transmitting the facsimile signal, or receiving a facsimile signal and converting the facsimile signal into document data.

The communication device 14 is a device in communication with the computer network 2 to perform data communication with another apparatus (the terminal apparatus 3) in communication with the computer network 2. For example, a network interface card (NIC) may be used as the communication device 14.

The data storage device 15 is a device for storing counter data 21 and counter reference sequence data 22. A hard disk drive, a non-volatile memory, or the like may be used as the data storage device 15.

Figure 2:
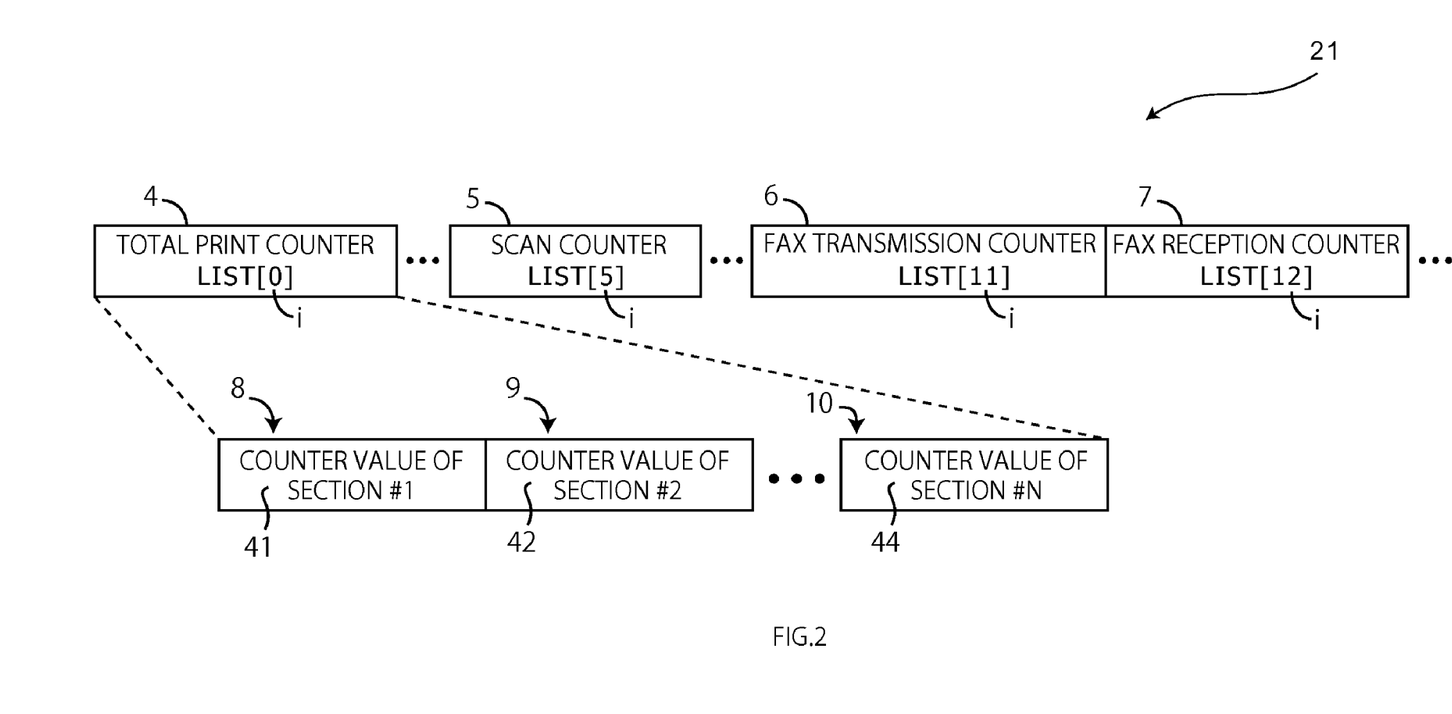
FIG. 2 is a schematic diagram illustrating an example of counter data.

The counter data 21 is data including counter values for a plurality of predetermined event types. FIG. 2 is a schematic diagram illustrating an example of the counter data 21. The counter data 21 illustrated in FIG. 2 is sequence data, and an element of the sequence data includes counter values for N sections.

For example, an element LIST[0] 4 of the counter data 21 includes an index i, wherein i=0. This identifies the element 4 as a total print counter 4, and represents sequence data having a counter value 41, 42 . . . 44 for each of the N sections 8, 9 . . . 10, respectively. The counter value of the total print counter is a value obtained by accumulating the number of pages printed using the printing device 11. In this embodiment, a log-in process is performed when the image forming apparatus 1 is used. The counter value is calculated for each section to which a user who logs in belongs.

Further, an element LIST[5] 5 of the counter data 21 includes an index i, wherein i=5. This identifies the element 5 as a scan counter 5, and represents sequence data having a counter value for each of the N sections 8, 9 . . . 10. The counter value of the scan counter 26 is a value obtained by accumulating the number of pages scanned using the image reading device 12.

Further, an element LIST[ 11] 6 of the counter data 21 includes an index i, wherein i=11. This identifies the element 6 as a facsimile (FAX) transmission counter 6, and represents sequence data having a counter value for each of the N sections 8, 9 . . . 10. The counter value of the FAX transmission counter 6 is a value obtained by accumulating the number of pages transmitted using the facsimile device 13. An element LIST[12] 7 of the counter data 21 includes an index i, wherein i=12. This identifies the element 7 as a FAX reception counter 7 and represents sequence data having a counter value for each of the N sections 8, 9 . . . 10. The counter value of the FAX reception counter is a value obtained by accumulating the number of pages received using the facsimile device 13.

Figure 3:
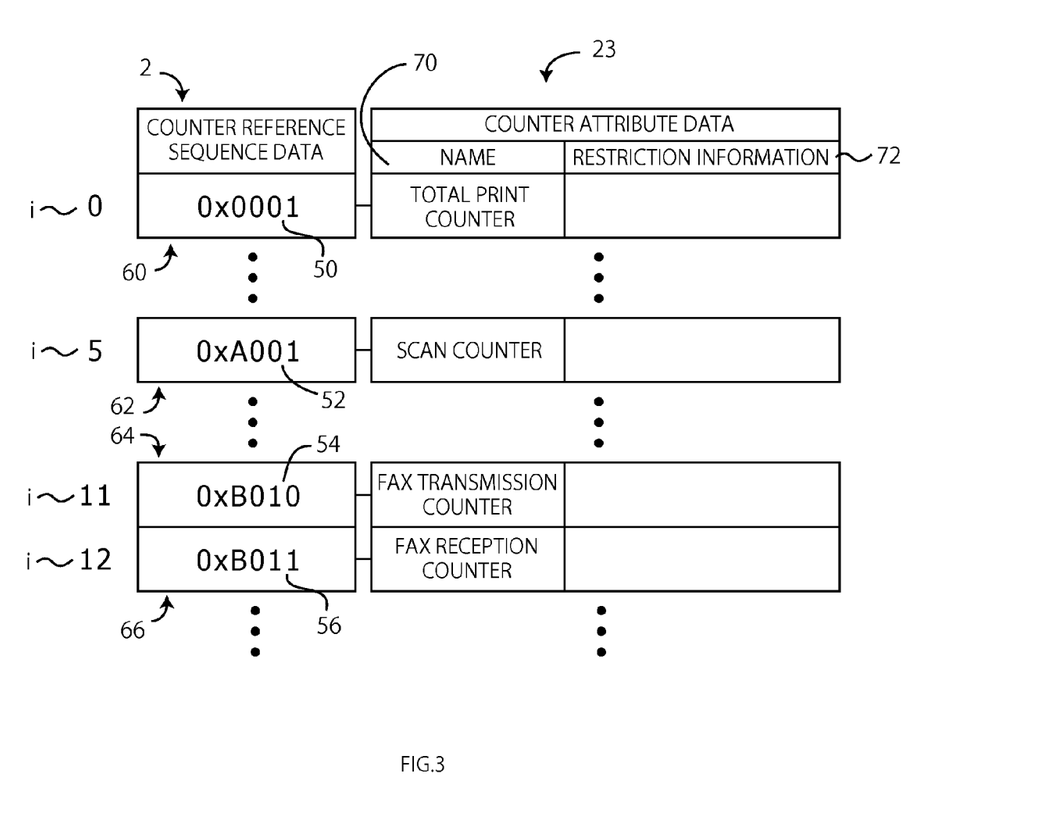
FIG. 3 is a schematic diagram illustrating an example of counter reference sequence data.

FIG. 3 is a schematic diagram illustrating an example of the counter reference sequence data 22. The counter reference sequence data 22 is sequence data including a plurality of elements 60 . . . 62 . . . 64, 66 having a plurality of counter IDs 50 . . . 52 . . . 54, 56, respectively. The counter reference sequence data 22 is sequence data and the counter IDs 50 . . . 52 . . . 54, 56 specify an event type to which each of the plurality of counter values in the counter data 21 correspond. In this embodiment, the value of an element of an index i in the counter reference sequence data 22 indicates the same index i in the elements LISTs in the counter data 21 described in FIG. 2.

The 0th element (i=0) 60 of the counter reference sequence data 22 illustrated in FIG. 3 has a counter ID 50 of 0x000. Since the value 0x000 is defined as the counter ID of the total print counter 24, the counter value of the 0th element LIST[0] 24 of the counter data 21 is specified as the counter value of the total print counter.

The fifth element (i=5) 62 of the counter reference sequence data 22 illustrated in FIG. 3 has a counter ID 52 of 0xA001. Since the value 0xA001 is defined as the counter ID of the scan counter 26, the counter value of the fifth element LIST[5] 26 of the counter data 21 is specified as the counter value of the scan counter 26.

The 11th element (i=11) 64 of the counter reference sequence data 22 illustrated in FIG. 3 has a counter ID 54 of 0xB010. Since the value 0xB010 is defined as the counter ID of the FAX transmission counter 28, the counter value of the 11th element LIST[11] 28 of the counter data 21 is specified as the counter value of the FAX transmission counter 28. The 12th element (i=11) 66 of the counter reference sequence data 22 illustrated in FIG. 3 has a counter ID 56 of 0xB011. Since the value 0xB011 is defined as the counter ID of the FAX reception counter 30, the counter value of the 12th element LIST[12] 30 of the counter data 21 is specified as the counter value of the FAX reception counter 30.

In this embodiment, counter attribute data 23 is stored in the data storage device 15 in association with the counter reference sequence data 22. The counter attribute data 23 includes a counter name 70 and restriction information 72, which are associated with each element 60 . . . 62 . . . 64, 66 (namely, each counter ID 50 . . . 52 . . . 54, 56, respectively) of the counter reference sequence data 22. The restriction information 23 includes the upper limit of a counter value, information regarding the corresponding counter ("active" or "inactive"), and the like. The functions of the internal devices are restricted by the controller 17 in accordance with the restriction information.

In this embodiment, the counter data 21 and the counter reference sequence data 22 are managed by an MIB, and are each an MIB object. Therefore, each of the counter data 21 and the counter reference sequence data 22 is assigned a unique object ID.

The communication processor 16 is a processor for controlling the communication device 14 to perform data communication via the computer network 2 using Transmission Control Protocol (TCP)/Internet Protocol (IP) or User Datagram Protocol (UDP)/IP. The communication processor 16 further functions as an SNMP agent.

The controller 17 is a processor for controlling an internal device such as the printing device 11, the image reading device 12, or the facsimile device 13 to execute a job requested from the terminal apparatus 3 or through an operation panel (not illustrated). The controller 17 further detects that one of a plurality of predetermined events has occurred in an internal device such as the printing device 11, the image reading device 12, and/or the facsimile device 13. The controller 17 specifies the position of the counter value corresponding to the event that has occurred, and increases the counter value in accordance with the detected event. When one event is associated with a plurality of counter values, all associated counter values are increased in accordance with the detected event.

The communication processor 16 and the controller 17 are implemented by executing a predetermined program by a built-in computer 20.

The terminal apparatus 3 includes a communication device 31, a communication processor 32 (an example of a second communication processor), and a utility 33 (an example of a counter value obtaining unit).

The communication device 31 is a device that is in communication with the computer network 2 and that can communicate with another apparatus (the image forming apparatus 1) that is in communication with the computer network 2. For example, a NIC may be used as the communication device 31.

The communication processor 32 is a processor for controlling the communication device 31 to perform data communication via the computer network 2 using TCP/IP or UDP/IP. The communication processor 16 further functions as an SNMP manager.

The utility 33 is a processor for obtaining counter values for a plurality of predetermined event types from the image forming apparatus 1.

The communication processor 32 and the utility 33 are implemented by executing a predetermined program by a built-in computer 34. The built-in computer 34 is a device including a central processing unit (CPU) 36, a read only memory (ROM) 38, a random access memory (RAM) 40. In the built-in computer 34, a program stored in the ROM 38, a data storage device (not illustrated), or the like, is loaded into the RAM 40 and is executed by the CPU 36.

Next, the operation of each apparatus in the system will be described.

Figure 4:
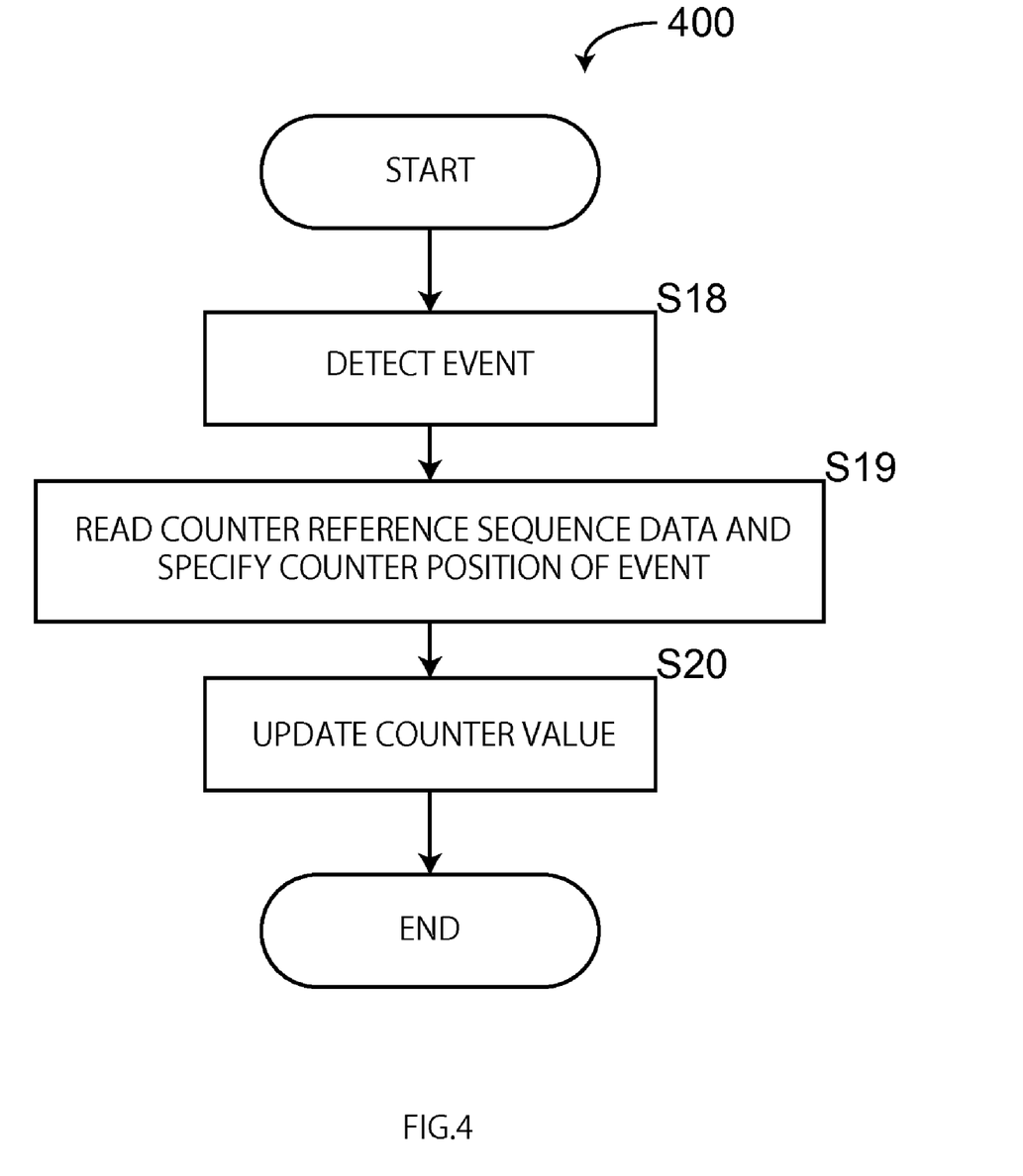
FIG. 4 is a flowchart describing a process for updating a counter value in an image forming apparatus according to an embodiment of the present invention.

First, the update of a counter value in the image forming apparatus 1 will be described. FIG. 4 is a flowchart describing a process for updating a counter value 400 in the image forming apparatus 1 according to an embodiment of the present invention.

In the image forming apparatus 1, upon detecting one of the plurality of predetermined event types (step S18), the controller 17 reads the counter reference sequence data 22, and specifies one or a plurality of counter IDs 50 . . . 52 . . . 54 and/or 56 corresponding to the detected event (S19). The controller 17 specifies one or a plurality of counter positions (an index value i in the counter data 21) from the index value i of the specified counter ID or IDs.

Upon specifying one or a plurality of counter positions, the controller 17 updates a counter value (such as 41, 42 . . . and/or 44) located at the one or plurality of counter positions in the counter data 21 (step S20). At this time, as illustrated in FIG. 2, in the case where a counter value is calculated for each section, the controller 17 specifies the section 8, 9 . . . and/or 10, to which the user who is logging in belongs, and updates the counter value for the specified section 8, 9 . . . and/or 10. Further, for example, when copying is detected, the counter value of the scan counter 26 and the counter value of the total print counter 24 are updated.

Accordingly, the position of the counter value to be updated in the counter data 21 is specified based on the counter reference sequence data 22, and the counter value corresponding to the detected event is updated.

Figure 5:
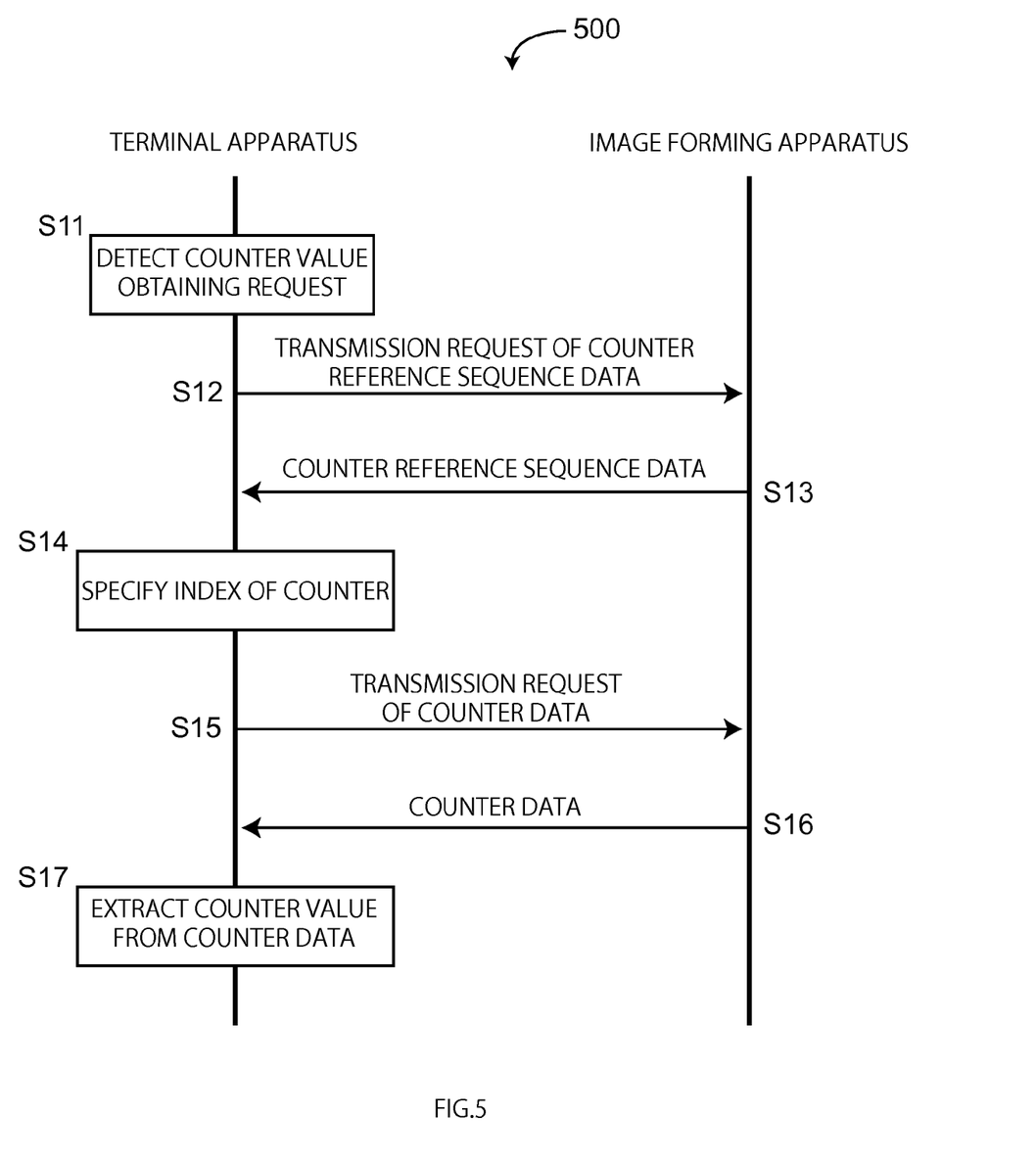
FIG. 5 is a schematic diagram describing a process in which a terminal apparatus obtains a counter value from the image forming apparatus according to an embodiment of the present invention.

FIG. 5 is a schematic diagram describing a process 500 in which the terminal apparatus 3 obtains a counter value from the image forming apparatus 1 according to an embodiment of the present invention.

Upon detecting a request for obtaining a counter value through an application (not illustrated), a user operation, or the like (step S11), the utility 33 of the terminal apparatus 3 causes the communication processor 32 to obtain the counter reference sequence data 22 from the image forming apparatus 1 (steps S12 and S13).

In the terminal apparatus 3, the communication processor 32 transmits an SNMP object obtaining command (SNMPGET command) that specifies the counter reference sequence data 22 by the object ID, to the image forming apparatus 1 through the communication device 31 and the computer network 2 (step S12). In the image forming apparatus 1, the communication processor 16 receives the SNMPGET command through the communication device 14, and reads the object instance (the counter reference sequence data 22) indicated by the object ID of the SNMPGET command from the data storage device 15. The communication processor 16 transmits the object instance to the terminal apparatus 3 through the communication device 14 and the computer network 2 (step S13). Then, the communication processor 32 of the terminal apparatus 3 receives the counter reference sequence data 22 through the communication device 31, and supplies the counter reference sequence data 22 to the utility 33.

The utility 33 extracts the counter IDs of the elements in the counter reference sequence data 22, and specifies index value in the counter data 21 (step S14). At this time, the utility 33 reads the counter IDs of the respective elements in order, starting from the 0th element of the counter reference sequence data 22 (namely, the first element in the sequence). For example, in the case of counter reference sequence data 22 illustrated in FIG. 3, when the counter value of the scan counter 26 has been requested, the element having an index value of 5 (counter ID is 0xA001) 60 is detected, and the index value of the element of the counter data 21 including the counter value of the scan counter 26 is specified to be 5.

Then, the utility 33 causes the communication processor 32 to obtain the counter data 21 from the image forming apparatus 1 (steps S15 and S16).

In the terminal apparatus 3, the communication processor 32 transmits an SNMP object obtaining command SNMPGET that specifies the counter data 21 by the object ID, to the image forming apparatus 1 through the communication device 31 and the computer network 2 (step S15). In the image forming apparatus 1, the communication processor 16 receives the command SNMPGET through the communication device 14, reads an instance (the counter data 21) of the object indicated by the object ID of the command SNMPGET from the data storage device 15. The communication processor 16 transmits the read instance (the counter data 21) to the terminal apparatus 3 through the communication device 14 and the computer network 2 (step S16). Then, the communication processor 32 of the terminal apparatus 3 receives the counter data 21 through the communication device 31, and supplies the counter data 21 to the utility 33.

Upon obtaining the counter data 21, the utility 33 reads the element of the index value specified in step 54 from the counter data 21 as the requested counter value (step S17). The read counter value is substituted in a predetermined counter variable.

Accordingly, the terminal apparatus 3 obtains all the counter reference sequence data 22 from the image forming apparatus 1 by using a single SNMP command, and obtains all the counter data 21 from the image forming apparatus 1 by using a single SNMP command.

It should be noted that the processing of step S14 may be performed immediately before the processing of step S17 or may be performed together with the processing of step S17.

According to the foregoing embodiment, therefore, the image forming apparatus 1 includes the data storage device 15 that stores the counter data 21 and the counter reference sequence data 22, and the communication processor 16 that communicates with the terminal apparatus 3 via SNMP to transmit the counter reference sequence data 22 and the counter data 21 to the terminal apparatus 3. The terminal apparatus 3 includes the communication processor 32 that communicates with the image forming apparatus 1 via SNMP to receive the counter reference sequence data 22 and the counter data 21 from the image forming apparatus 1, and the utility 33 that specifies the event type of each counter value in the counter data 21 on the basis of the value of each element in the counter reference sequence data 22 and that extracts the counter value of the requested event type.

Therefore, since a plurality of counter IDs each indicating an event type in a plurality of counter values are included in one data, the terminal apparatus 3 can obtain the counter values stored in the image forming apparatus 1 for a short time. Further, when the order of the counter values in the counter data 21 is changed, it is only required to change the order of the counter IDs in the counter reference sequence data 22 in accordance with the change in the order of the counter values. It is not necessary to change the processing procedure of the terminal apparatus 3.

According to the foregoing embodiment, the communication processor 32 obtains the counter reference sequence data 22 from the image forming apparatus 1 by a single transmission of an SNMP command.

This can reduce the number of communications between the terminal apparatus 3 and the image forming apparatus 1, as compared to the case illustrated in FIG. 6. It is possible to obtain the counter values stored in the image forming apparatus 1 by the terminal apparatus 3 for a short time.

The present invention includes various other embodiments. For example, other designs can be used in which the above-described components are each performed.

For example, in the foregoing embodiment, a total print counter, a scan counter, a FAX transmission counter, and a FAX reception counter are used as counters. Other counters such as a copy counter, a copy scanner counter, a duplex print counter, a simplex print counter, a color print counter, a monochrome print counter, a 2in1 (2UP) print counter, and a 4in1 (4UP) print counter can be used.

What is claimed is:

1. An image forming system comprising:
   an image forming apparatus comprising
      a counter configured to count a number of event occurrences in the image forming apparatus;
      a data storage device in communication with the counter and configured to store the number of event occurrences as counter data and counter reference sequence data, wherein the counter data includes a plurality of counter values corresponding to a plurality of event types and wherein the counter reference sequence data includes a plurality of counter IDs indicating to which of the plurality of event types the counter values correspond, wherein the counter data is stored as a single Management Information Base (MIB) object and the counter reference sequence data is stored as a single MIB object; and
      a first communication processor configured to communicate the counter data and the counter reference sequence data with a terminal apparatus via a Simple Network Management Protocol (SNMP); and
   a terminal apparatus comprising:
      a second communication processor configured to receive the counter data and the counter reference sequence data from the image forming apparatus, wherein the second communication processor is configured to obtain the counter data from the image forming apparatus by a single transmission of an SNMP command and the second communication processor is configured to obtain the counter reference sequence data from the image forming apparatus by a single transmission of an SNMP command; and
      a counter value obtaining unit configured to specify the event type of each of the counter values in the counter data obtained by the single transmission of the SNMP command on the basis of a value of each of elements in the counter reference sequence data and obtain the counter value of the requested event type,
      wherein the counter IDs of the counter reference sequence data identify one of the plurality of event types as corresponding to one of the plurality of counter values having an index value that is the same as an index value of the counter ID.

2. The image forming system according to claim 1, wherein the counter value obtaining unit comprises a utility.

3. The image forming system according to claim 2 further comprising a computer in the terminal apparatus configured to execute a program to implement the utility.

4. The image forming system according to claim 1, wherein the SNMP command comprises a SNMPGET command for obtaining an SNMP object specified by an object identifier (OID).

5. The image forming system according to claim 4, wherein each of the SNMP commands comprises a SNMPGet command for obtaining an SNMP object specified by an OID.

6. The image forming system according to claim 1, wherein the image forming apparatus further comprises a printing device, an image reading device, and/or a facsimile device.

7. The image forming system according to claim 1, wherein the counter reference sequence data comprises reference information corresponding to the counter values.

8. The image forming system according to claim 1, wherein the counter data comprises sequence data.

9. An image forming apparatus comprising:
a counter configured to count a number of event occurrences in the image forming apparatus;
a data storage device in communication with the counter and configured to store the number of event occurrences as counter data and counter reference sequence data, the counter data being stored as a single Management Information Base (MIB) object and the counter reference sequence data being stored as a single MIB object, wherein the counter data includes a plurality of counter values corresponding to a plurality of event types and wherein the counter reference sequence data includes a plurality of counter IDs indicating to which of the plurality of event types the counter values correspond; and
a communication processor configured to communicate the counter data and the counter reference sequence data with a terminal apparatus via a Simple Network Management Protocol (SNMP), wherein the communication processor is configured to transmit the counter data by a single transmission of an SNMP command, and the communication processor is configured to transmit the counter reference sequence data by a single transmission of an SNMP command;
wherein the counter IDs of the counter reference sequence data identify one of the plurality of event types as corresponding to one of the plurality of counter values of having an index value that is the same as an index value of the counter ID.

10. The image forming apparatus according to claim 9, wherein the counter data comprises sequence data.

11. The image forming apparatus according to claim 9, further comprising a printing device, an image reading device, and/or a facsimile device.

12. The image forming apparatus according to claim 9, wherein the event types comprise a printing event, an image reading event, and/or a facsimile event.

13. The image forming apparatus according to claim 9, wherein the counter reference sequence data further comprises reference information corresponding to the counter values.

14. The image forming apparatus according to claim 9, wherein the data storage device is further configured to store counter attribute data in association with the counter reference sequence data.

15. The image forming apparatus according to claim 14, wherein counter attribute data comprises a counter name and restriction information that are associated with at least one of the plurality of counter IDs.

* * * * *